United States Patent [19]

Beyl

[11] 4,330,228
[45] May 18, 1982

[54] DRILLING AND TAPPING JIG FOR SKIS
[75] Inventor: Jean J. A. Beyl, Nevers, France
[73] Assignee: Look, Nevers, France
[21] Appl. No.: 101,712
[22] Filed: Dec. 10, 1979
[30] Foreign Application Priority Data
Dec. 18, 1978 [FR] France .................................. 78 35509
[51] Int. Cl.³ .......................................... B23B 49/00
[52] U.S. Cl. ............................ 408/112; 408/115 R
[58] Field of Search ............ 408/115 R, 115 B, 72 R, 408/112; 269/2, 87.3

[56] References Cited
U.S. PATENT DOCUMENTS

| | | | |
|---|---|---|---|
| 2,029,650 | 2/1936 | Betz .................................. | 408/115 |
| 2,527,968 | 10/1950 | Sherman et al. ................ | 408/112 X |
| 3,146,675 | 9/1964 | Anderson .......................... | 408/115 |
| 3,299,747 | 1/1967 | Martin et al. .................... | 408/112 |
| 3,973,860 | 8/1976 | Kern ................................ | 408/115 R |
| 4,105,359 | 8/1978 | Schneider ........................ | 408/112 |
| 4,138,200 | 2/1979 | Nazarenus ...................... | 408/112 X |
| 4,179,231 | 12/1979 | Hadden .......................... | 408/112 |

Primary Examiner—William R. Briggs
Attorney, Agent, or Firm—Jordan B. Bierman; Linda G. Bierman

[57] ABSTRACT

A jig for drilling and/or tapping in a ski top the holes necessary for fixing a safety ski binding thereto comprises a frame adapted to be temporarily secured to the ski and consisting of a pair of parallel elastic rods along which a pair of slides are movable and adapted to be locked in the desired positions; each slide carries the necessary number of guide sockets for the bit and/or tap, the socket length and position on the frame being such that in combination with shoulder means provided on the bit and/or tap the depth of penetration of the bit or tap into the ski cannot exceed a predetermined value.

11 Claims, 12 Drawing Figures

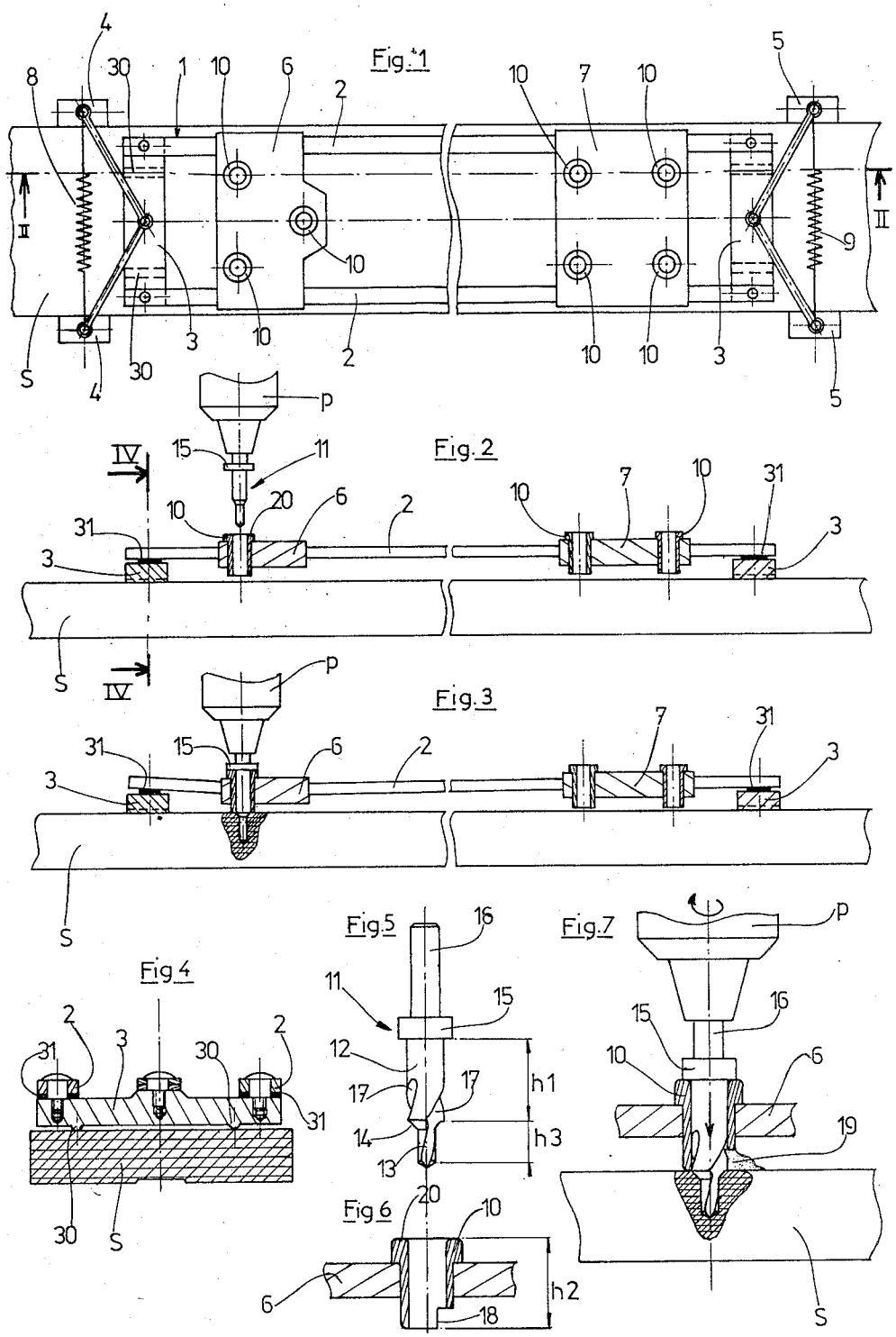

DRILLING AND TAPPING JIG FOR SKIS

BACKGROUND OF THE INVENTION

1. Field of the Invention

This invention relates to jigs and has specific reference to a tool means of this character for drilling and/or tapping in skis the holes to be subsequently engaged by the screws used for fixing ski bindings thereto. The invention is also directed to a method of drilling and tapping these holes in succession.

2. Description of the Prior Art

The tool means now in general use for fixing ski bindings comprise on the one hand a jig associated with a twist bit and on the other hand as crew-tap.

The jig comprises several bit guiding sockets having a relative spacing or distance between centers corresponding to that of the holes formed in the ski binding for the passage of the fixing screws. The jig is provided with retaining members, generally of the jaw type, for safely fastening the jig to the ski during the drilling and/or tapping operation.

As a rule, the twist bit is of the shouldered type, the body being connected to its tip by a shoulder adapted to engage the top surface of the ski upon completion of the drilling step.

On the other hand, the tap consists in most instances of a handle and of a tap bit secured centrally and at right angles thereto, the assembly being substantially T-shaped.

At the end of the drilling operation the jig is removed from the ski.

When self-tapping screws are used, the binding can be secured directly to the ski, since these screws tap their holes directly during the screwing operation.

If conventional screws are used each hole must be tapped. This step is accomplished manually by using a tap.

The jig and drilling method broadly described hereinabove are objectionable on account of the following drawbacks:

Since the presence of a jig conceals the twist drill tip to the operator, the latter becomes aware that the drilling depth is attained when he feels an increased resistance to the drill penetration, this increased resistance corresponding to the engagement between the drill shoulder and the ski surface.

However, this estimation, based on a feeling, that the desired drilling depth is attained, is rather uncertain and likely to be a source of frequent errors. Therefore, some operators are inclined, in a first step, to drill relatively shallow holes and to subsequently remove the jig and complete the drilling operation in a second step during which they can check the drilling progress visually. Though the risks of errors are thus reduced, the time necessary for completing the operation is increased considerably.

Another source of frequent errors is the tapping operation carried out subsequently. In fact, this operation is performed after removing the jig, so that the tap is not guided and its point is likely to engage the hole askew and thus damage this hole, inasmuch as after about each half-turn of the tap the operator must release it, since this tap is actuated and operated in the fashion of a corkscrew.

From the foregoing it is clear that up to now no tool means nor methods have been proposed for rapidly and accurately drilling and tapping holes for fixing ski-bindings to skis unless the operator's skill and experience constitute a determinant factor.

It is the essential object of the present invention to compensate for this insufficiency.

SUMMARY OF THE INVENTION

For this purpose, the tool means according to this invention comprises a jig and a twist bit and/or tap of the type set forth hereinabove. According to the invention, the jig comprises a frame liable to elastic distortion so that, at least at the end of the drilling and/or tapping stroke, the inner face of the guide socket fitted in the frame can engage the top surface of the ski while the twist bit and/or the tap is or are provided with a shoulder adapted to engage the top or outer end face of the corresponding guide socket, the distance measured between the tip of the bit and/or tap and said shoulder being equal to the sum of the axial length of the guide socket and the depth of the hole to be drilled and/or tapped.

The frame advantageously comprises a pair of flexible rods extending parallel to the ski axis and the guide sockets are guided by a pair of slides movable along said rods.

Preferably, a frustoconical portion is interposed between the tip and the body of the bit, and the shoulder formed on the bit and/or tap may consist of a sleeve-like insert. Also advantageously, the tap actuating member may consist of a crank handle.

The method of drilling and tapping according to this invention consists in holding the drill jig rigid with the ski during the tapping operation, the sockets being used for guiding the tap.

Other features and advantages of this invention will appear as the following description proceeds with reference to the accompanying drawing illustrating by way of example a typical form of embodiment of the tool means of this invention.

BRIEF DESCRIPTION OF THE DRAWING

FIG. 1 is a top view showing a jig according to this invention, fitted to a ski preliminary to the drilling and tapping operations;

FIG. 2 illustrates the position of the tool means of this invention before a drilling operation, the jig being shown in section according to the dot and dash line II—II of FIG. 1;

FIG. 3 is a view similar to FIG. 2 but showing the relative positions of the drill, bit, jig and ski at the end of a drilling operation;

FIG. 4 illustrates on a larger scale the jig in section taken along the line IV—IV of FIG. 2;

FIGS. 5 and 6 illustrate on a larger scale a bit and the corresponding guide socket, respectively, according to the invention;

FIG. 7 shows how the bit and socket of FIGS. 5 and 6 cooperate during a drilling operation;

DESCRIPTION OF THE PREFERRED EMBODIMENT

Figure 8:
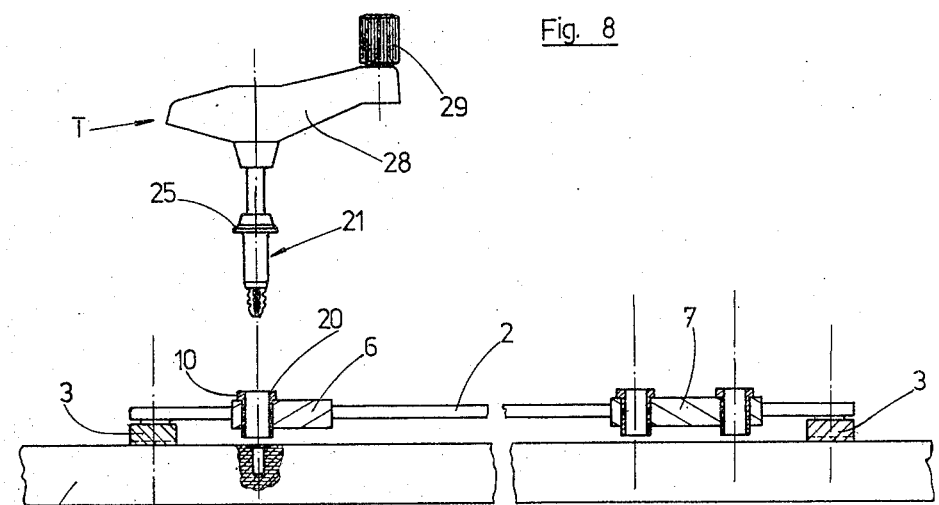
FIG. 8 is a view similar to FIG. 2 showing tool means consistent with the invention, before starting a tapping operation.

The drill jig illustrated in FIGS. 1 to 4 of the drawing comprises essentially a frame 1 consisting of a pair of parallel rods 2 assembled at their ends by a pair of cross members 3. The jig further comprises a pair of clamping jaws 4, 5 and two slides 6, 7 movable along and guided by the rods 2.

The jaws 4, 5 fulcrumed to cross members 3 are used in the known fashion for firmly securing the jig to the ski during the drilling and tapping operations. Spring means shown only diagrammatically at 8 and 9 are provided for constantly urging the jaws 4, 5 against the corresponding side faces of the ski S in order to grip the latter. In this position the rods 2 are parallel to the longitudinal center line of the ski.

Fitted in accurately drilled holes perpendicular to the main faces of slides 6 and 7 are a plurality of guide means 10 in the form of cylindrical sockets. The relative arrangement of these sockets 10 on slides 6 and 7 corresponds of course to the through holes provided for the fastening screws in the front section (toe abutment device) and rear section (heel hold-down device) of the safety ski binding (not shown), assuming that the front end of the ski is on the left side of FIGS. 1 and 2.

The lower portion of cross members 3 are provided with shallow projections 30 engaging the top surface of the ski S. The rods 2 are connected to the cross members 3 with the interposition of rubber or like resilient grommets 31.

The bit 11 illustrated in FIGS. 2, 3, 5 and 7, adapted to be rotated by a conventional drill P, comprises a shank 16, a collar or shoulder 15, a main body 12, a tip 13 of a diameter somewhat smaller than that of said body 12, and a frusto-conical portion 14 interconnecting said portions 12 and 13. The helical grooves 17 are formed mainly in portions 13, 14 and partly in portion 12, as shown.

The guide socket 10 as clearly shown in FIG. 6, has a substantially cylindrical configuration and is secured to the slide 6 so that its end portions project from the top and bottom faces of the slide. Each socket 10 has a flat annular top bearing face 20 and at its lower end a notch 18 for purposes to be explained presently. The inner diameter of socket 10 matches the diameter of the bit body 12.

Figure 9:
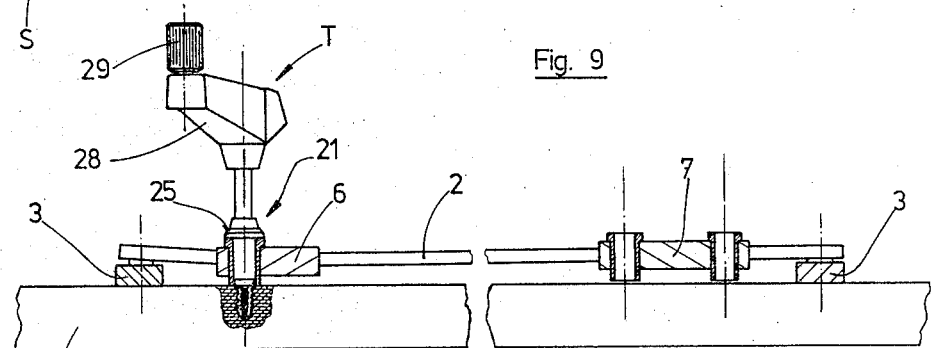
FIG. 9 is a view similar to FIG. 8 but taken at the end of the tapping operation.
Figure 10:
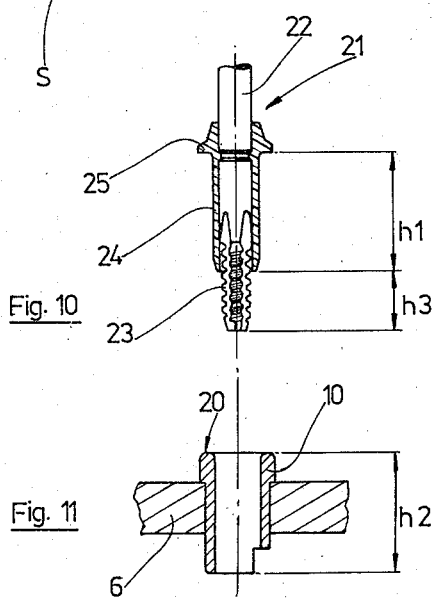
FIGS. 10 and 11 illustrate on a larger scale a tap and a corresponding drill socket according to this invention.
Figure 11:
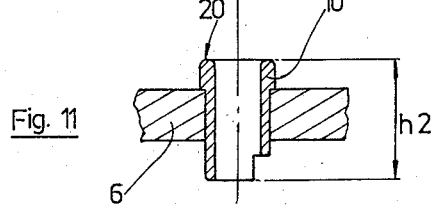
Figure 12:
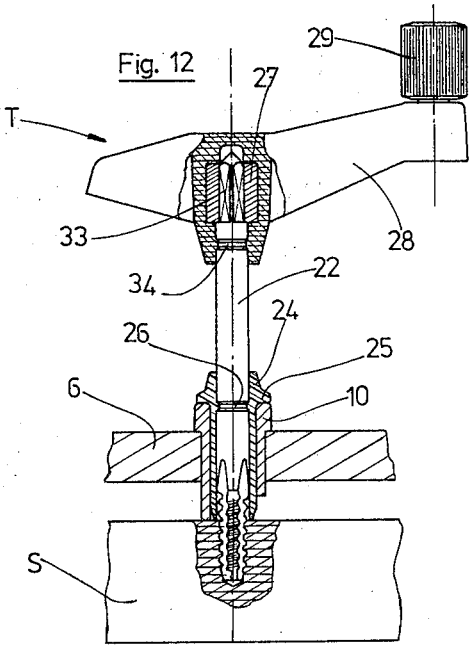
FIG. 12 shows the tap and socket of FIGS. 10 and 11 which are associated for performing a tapping operation.

The tapping means illustrated in FIGS. 8 to 12 of the drawing comprise the jig already described hereinabove and a tap assembly T comprising a tap proper 21 and a manual driver consisting of a crank handle 28 and a knob 29.

The tap 21 is locked against rotation in the crank handle 28 by means of a member 27 embedded in the latter (FIG. 12) and cooperating with the square-sectioned top portion 33 of tap 21. The coupling is releasable in the axial direction of translation and comprises means on said crank handle 28 which are adapted snappily to engage a groove 34 formed on said tap 21.

This tap 21 comprises a body 22 and a thread-cutting end or tip 23. The body 22 has another groove 26 formed therein which is snappily engageable by a plastic sleeve-like insert 24 formed with an annular bead or shoulder 25. The outer diameter of this sleeve 24 is equal to the inner diameter of guide sockets 10.

The above-described drilling and tapping tool means are used as follows:

Firstly, the jig is secured to the ski as shown in FIGS. 1 and 2, and the slides 6, 7 are moved along the guide rods 2 to the proper positions for fixing the safety ski binding to the ski, the relative spacing of slides 6 and 7 depending of course on the skier's boot size. Then, the slides 6, 7 are locked in position through suitable means (not shown). To simplify the drawing, the top surface of the ski is shown as being a flat one (FIGS. 2 and 3). Under these conditions, the jig bears on the ski only through shallow projections 30 formed on the bottom faces of cross members 3, so that the guide sockets 10 are slightly spaced from the ski. However, in actual practice the ski is more or less curved, with a convex top surface, and the guide sockets 10 tend to bear against the ski surface.

Now according to this invention the rods 2 are liable to undergo an elastic deformation in order to accomodate the ski curvature, this deformation being allowed by the provision of resilient grommets or washers 31 between the rods 2 and cross members 3. Thus, as a rule all the guide sockets 10 contact the ski surface when the jig is secured to the ski. If not, this contact takes place at any rate at the end of the drilling stroke, as illustrated in FIG. 3. This advantageous result is due to the provision on bit 11 of a shoulder 15 which, at the end of the downward or drilling stroke of the bit, engages the top annular bearing face 20 of socket 10, thus causing the rods 2 to yield resiliently until the bottom end of socket 10 contacts the ski (FIG. 3). When this contact takes place the proper drilling depth is attained automatically. In fact, according to the invention, the length h1 of the bit body 12 is equal to the height of socket 10; consequently the hole depth is well-defined and equal to the distance h3 measured between the outer end of tip 13 and the bit body 12.

When he is aware that the bit abuts the top of the cooperating socket 10, the operator extracts the bit from the hole and starts drilling the next hole through another socket, the elastic rods 2 resuming their initial, straight configuration.

It will be seen that chips, cuttings and like waste 19 are easily removed through the notch 18 formed in each socket 10.

The purpose of the frustoconical portion 14 is to countersink the holes and thus provide room for the chips to be cut subsequently during the ski binding operation involving the screwing in of fastening screws.

In general, the drilling operation is followed by a tapping operation.

According to this invention the jig 1 is held on the ski during this second operation. The tap assembly T is then guided during its rotational movements by the corresponding socket 10 so that the movements of tap 21 take place accurately in the axial direction of the hole.

As in the case of the drilling step, the shoulder 25 of tap 21 eventually engages the annular bearing face 20 of socket 10, the lower face of latter bearing in turn on the ski.

The crank handle assembly 28, 29 facilitates the tap operation because the operator can keep the tap rotating continuously, in contrast to the present mode of operation requiring that the crank be released after each half-revolution.

From the foregoing it will be clearly apparent to those conversant with the art that with the tool means according to the instant invention even unskilled hands can safely drill and tap holes in skis for fixing ski bindings thereto.

Of course, the invention should not be construed as being strictly limited by the specific form of embodiment shown and illustrated herein by way of example, since many modifications and changes may be brought thereto without departing from the basic principles of the invention as set forth in the appended claims.

What is claimed is:

1. Apparatus for drilling and tapping in a ski holes of predetermined depth for receiving therein screws necessary for fixing a safety ski binding to the ski, said apparatus comprising:

a jig including an elastically deformable frame, releasable means on said frame for securing said jig to the ski during a drilling and tapping operation, and a plurality of guide sockets carried on said frame relatively spaced apart in accordance with the spacing of screw passage holes provided in the ski binding, each of said guide sockets including a top face, a bottom face, and an axial bore of predetermined diameter defined through said socket between said top and bottom faces thereof; and a bit and a tap, each including a body of substantially said predetermined diameter for guided entry into said guide socket bore during a drilling and tapping operation, a tip at one end of said body, and a shoulder spaced from said tip axially along said body and adapted to bear against the top face of said guide socket during a drilling and tapping operation, the spacing between the end of said tip and said shoulder of each said bit and tap being substantially equal to the sum of the axial length of said guide sockets and the predetermined depth of the holes to be drilled and tapped so that when said body of the bit or tap is fully inserted into the bore of one of said guide sockets whereby said shoulder abuts the socket top face, the eastic deformability of said frame enables the socket lower face to bear against the ski such that a hole thereby prepared in the ski is limited to the predetrmined depth.

2. Apparatus for drilling and tapping in accordance with claim 1, said frame comprising a set of flexible rods for disposal substantially parallel to the axis of the ski when said jig is secured to the ski, and said guide sockets being carried by a pair of slides movable and selectively positionable along said rods for a drilling and tapping operation.

3. Apparatus for drilling and tapping in accordance with claim 1, said bit further including a frustoconical surface connecting said bit body to said bit tip so as to countersink the hole formed thereby in the ski.

4. Apparatus for drilling and tapping in accordance with claim 2, said bit further including a frustoconical surface connecting said bit body to said bit tip so as to countersink the hole formed thereby in the ski.

5. Apparatus for drilling and tapping in accordance with claim 4, said shoulder of at least one of said bit and tap being formed by a sleeve-like insert fitted thereon.

6. Apparatus for drilling and tapping in accordance with claim 5, further comprising tap actuating means consisting of a crank handle.

7. Apparatus for tapping in a ski holes of predetermined depth for receiving therein screws necessary for fixing a safety ski binding to the ski, said apparatus comprising:

a jig including an elastically deformable frame, releasable means on said frame for securing said jig to the ski during a tapping operation, and a plurality of guide sockets carried on said frame relatively spaced apart in accordance with the spacing of screw passage holes provided in the ski binding, each of said guide sockets including a top face, a bottom face, and an axial bore of predetermined diameter defined through said socket between said top and bottom faces thereof; and a tap including a body of substantially said predetermined diameter for guided entry into said guide socket bore during a tapping operation, a tip at one end of said body, and a shoulder spaced from said tip axially along said body and adapted to bear against the top face of said guide socket during a tapping operation, the spacing between the end of said tip and said shoulder of said tap being substantially equal to the sum of the axial length of said guide sockets and the predetermined depth of the holes to be tapped so that when said body of the tap is fully inserted into the bore of one of said guide sockets whereby said shoulder abuts the socket top face, the elastic deformability of said frame enables the socket lower face to bear against the ski such that a hole thereby tapped in the ski is limited to the predetermined depth.

8. Apparatus for tapping in accordance with claim 7, said frame comprising a set of flexible rods for disposal substantially parallel to the axis of the ski when said jig is secured to the ski, and said guide sockets being carried by a pair of slides movable and selectively positionable along said rods for a tapping operation.

9. Apparatus for drilling in a ski holes of predetermined depth for receiving therein screws necessary for fixing a safety ski binding to the ski, said apparatus comprising:

a jig including an elastically deformable frame, releasable means on said frame for securing said jig to the ski during a drilling operation, and a plurality of guide sockets carried on said frame relatively spaced apart in accordance with the spacing of screw passage holes provided in the ski binding, each of said guide sockets including a top face, a bottom face, and an axial bore of predetermined diameter defined through said socket between said top and bottom faces thereof; and a bit including a body of substantially said predetermined diameter for guided entry into said guide socket bore during a drilling operation, a tip at one end of said body, and a shoulder spaced from said tip axially along said body and adapted to bear against the top face of said guide socket during a drilling operation, the spacing between the end of said tip and said shoulder of said bit being substantially equal to the sum of the axial length of said guide sockets and the predetermined depth of the holes to be drilled so that when said body of the bit is fully inserted into the bore of one of said guide sockets whereby said shoulder abuts the socket top face, the elastic deformability of said frame enables the socket lower face to bear against the ski such that a hole thereby drilled in the ski is limited to the predetermined depth.

10. Apparatus for drilling in accordance with claim 9, said frame comprising a set of flexible rods for disposal substantially parallel to the axis of the ski when said jig is secured to the ski, and said guide sockets being carried by a pair of slides movable and selectively positionable along said rods for a drilling operation.

11. Apparatus for drilling in accordance with claim 9, said bit further including a frustoconical surface connecting said body to said tip so as to countersink the hole formed thereby in the ski.

* * * * *